Nov. 18, 1924.
E. R. BROKVIST
1,516,077
PRESSURE AND VACUUM GAUGE
Filed July 12, 1921
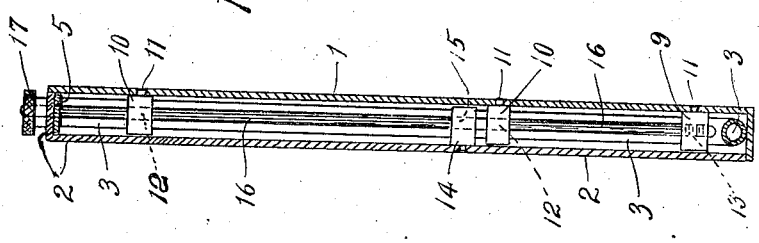
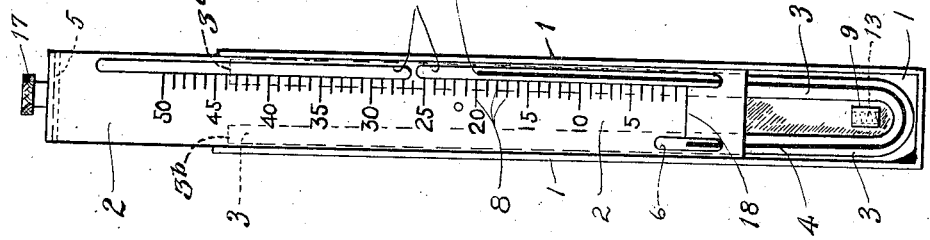
INVENTOR
Eric R. Brokvist Patented Nov. 18, 1924.

1,516,077

UNITED STATES PATENT OFFICE.

ERIC R. BROKVIST, OF BROOKLYN, NEW YORK.

PRESSURE AND VACUUM GAUGE.

Application filed July 12, 1921. Serial No. 484,055.

*To all whom it may concern:*

Be it known that I, ERIC R. BROKVIST, a citizen of the United States, residing at Brooklyn, in the county of Kings and State of New York, have invented certain new and useful Improvements in Pressure and Vacuum Gauges, of which the following is a full, clear, and exact description.

This invention relates to portable gauges for indicating the pressure or vacuum in a space to which it may be connected, whether atmospheric pressure or that existing in a conduit or chamber. It is essential or desirable that barometer gauges and gauges for measuring blood pressure, pressure and vacuum in the mechanism of player pianos that are operated on the pneumatic principle, and for various other uses, be portable if they are to have their maximum usefulness. The most accurate and satisfactory pressure and vacuum gauges are those which comprise a tube with a column of liquid therein, but such gauges have not heretofore been readily portable because of the danger of breakage and also loss of the liquid from the open ends of the tubes. Many of such gauges have also been capable of measuring either a vacuum, or pressure above atmosphere, but not both.

An object of this invention is to provide a gauge utilizing a column of liquid as the measuring medium, which can be carried or moved about without danger of breakage or loss of the measuring liquid, which permits of the direct measurement of the difference in levels of the ends of the column of measuring liquid, which is easily manipulated and connected to the device or chamber the vacuum or pressure within which it is desired to measure, which is capable of use either as a vacuum or direct pressure gauge, and which is simple, strong and durable in construction, and inexpensive to manufacture. Other objects and advantages will be apparent from the following description and the novel features of my invention will be particularly pointed out in claims.

In carrying my invention into practice I may provide a casing having a relatively movable cover section. The casing carries the measuring tube, generally U-shaped, with any open ends disposed to be sealed by the cover or movable section when the latter closes the casing. The movable cover section is provided with windows enabling observation of the liquid in the tube, and may have a scale co-operating with the windows for enabling direct measurement of the difference in level of the ends of the column of measuring liquid, by the adjustment of the cover section relative to the casing. The casing may also be provided with a device for securing the cover or movable section in closed position with the tube sealed when the gauge is to be carried about, and this device may, if desired, constitute means for guiding the cover or movable section in its movement with respect to the casing. The invention also comprises certain details and arrangements of parts which will be hereinafter explained.

In the accompanying drawing:

Fig. 1 is a front elevation of a gauge which has been constructed in accordance with my invention, and Fig. 2 is a sectional elevation of the same.

In the drawings I have illustrated a gauge which is capable of measuring both vacuum and pressure. The device comprises a casing 1 having a cover section 2 comprising a face and an end which is slidable along the casing to open and close the same. Within the casing I dispose a U-shaped transparent indicating tube 3 which is secured therein in any suitable manner with the open ends 3$^a$ and 3$^b$ of the tube disposed adjacent the end of the movable cover section 2. The tube is partially filled with a suitable liquid 4 such as water or mercury, and the open ends of the tube may be closed by a plate 5 of cork or similar material carried upon the inner face of the movable end and arranged to abut against and close the open ends of the tube when the movable cover and end of the casing are shifted to entirely close the casing. The movable section 2 is provided with a plurality of windows 6 and 7 which permit of inspection of the column of liquid within the tube. The window 6 for one arm of the tube may be very short and in such a case the windows 7 for the other arm should have a total length substantially co-extensive with the major portion of the length of the casing. A suitable scale 8 is placed upon the movable section 2 for co-operating with the windows to directly measure the difference in level between the ends of the column of the liquid within the tube when the section 2 is shifted along the casing.

The casing 1 is provided upon its rear face with a plurality of lugs 9 and 10 which extend between the arms of the tube and abut against the inner face of the cover section 2. These lugs are secured to the casing in any suitable manner such as by rivet studs 11 carried thereby and riveted into apertures in the casing. The lugs 10 are provided with aligned apertures 12 and the lug 9 is provided with a threaded aperture 13 which is aligned with the apertures 12. The cover section 2 is provided with a lug 14 which projects into the casing between the arms of the tube, and abuts against the inner face of the rear wall of the casing, the lug being provided with an aperture 15 in alignment with the apertures 12. A rod 16 is rotatably disposed in the end of the cover section and extends into the casing and through the aligned apertures in all of the lugs. The inner end of the rod is threaded for engagement with the threaded aperture 13 of the lowermost lug 9. A knurled button 17 is carried by the rod exteriorly of the casing and section 2 for facilitating its rotation.

The casing is normally closed by the movable section member 2 and the rod is threaded into the lug 9 to lock the cover section in closed position with the cork disc 5 pressed against the open ends of the tubes to seal the same and prevent loss of the liquid therefrom as the casing is carried about. When the pressure of any device is to be measured the casing is supported in a vertical position, the button 17 is rotated to unscrew the rod 16 from the lug 9 which permits the cover section to be shifted upwardly, the lugs 10 and 14 together with the rod 16 forming guides for maintaining the cover section in proper position with respect to the casing during relative movement with respect to the casing. The upward movement of the cover section exposes the ends of the tube and a rubber connecting tube can then be engaged upon one end of the tube 3 and also connected with the device whose pressure is to be measured. When it is pressure above atmosphere to be measured, that arm of the tube will be chosen for the connection of the rubber tube which is on the side of the cover member with the shorter window. The pressure in the device will be communicated to the tube 3 and will force the column of liquid up the opposite arm of the tube until the difference in level of the ends of the column of liquid represents the length of a theoretical column of liquid which would exert a pressure per unit area equal to that in the device whose pressure is being measured, whereupon the column of liquid 4 will come to rest. The cover section is then shifted to bring the zero mark 18 of the scale 8 opposite the lowermost end of the column of liquid 4 and the scale unit standing opposite the other end of the liquid column will represent the difference in level of the ends of the column of liquid 4, which may be computed in terms of pressure per unit area, or the pressure per unit area can be directly indicated upon the scale. If it is desired to measure the vacuum existent in a device the connection is made to the other arm of the U-shaped tube and the vacuum then produced in that end of the tube will result in the atmospheric pressure upon the other end of the tube forcing the column of liquid in the end of the tube which is connected to the device to a height corresponding to the degree of vacuum in the device.

When the measurements are completed and it is desired to transport the gauge it is merely necessary to remove the rubber tube connection from the tube 3, shift the cover section downwardly to close the casing, and then rotate button 17 to cause the rod 16 to be threaded into the lug 9 and lock the cover section closed with the cork plate 5 sealing the ends of the tube. It will be obvious that the casing when closed can be carried about without danger of leakage of the liquid from the tube, and the tube is protected against breakage by the cover section, the lugs preventing movement of the cover section towards the casing such as would cause a crushing of the tube.

While I have illustrated my invention as embodied in a combined pressure and vacuum gauge wherein both ends of the tube are open it will be obvious that this is for the purpose of explanation of the principle of the invention, and that the invention may be applied to gauges such as barometers, in which but one end of the tube is open. Various other changes may be made by those skilled in the art within the principle and scope of the invention.

I claim:

1. In a portable vacuum and pressure gauge, the combination of a casing having a face and an end slidable thereon to form a cover, a U-shaped transparent indicating tube mounted in said casing with the ends of the arms of the tube open and adjacent the movable end, and means carried by the movable end for engaging and sealing the ends of the tube when the cover is in closed position, and exposing them for connection of either to a source of pressure or vacuum to be measured when the cover is in open position.

2. In a portable vacuum and pressure gauge, the combination of a casing having a face and an end slidable thereon to form a cover, a U-shaped transparent indicating tube mounted in said casing with the ends of the arms of the tube open and adjacent the movable end, means carried by the movable end for engaging and sealing the ends of the tube when the cover is in closed position, and exposing them for connection of either to a source of pressure or vacuum to be measured when the cover is in open position, said face of the cover having windows permitting observation of the tubes and also a scale, co-operating with the windows for enabling direct measurement of the difference in level of the ends of the column of a liquid in said tube.

3. In a portable vacuum and pressure gauge, the combination of a casing having a face and an end slidable thereon to form a cover, a U-shaped transparent indicating tube mounted in said casing with the ends of the arms of the tube open and adjacent the movable end, means carried by the movable end for engaging and sealing the ends of the tube when the cover is in closed position, and exposing them for connection of either to a source of pressure or vacuum to be measured when the cover is in open position, and means for releasably locking the cover in said closed position.

4. In a portable vacuum and pressure gauge, the combination of a portable support, a U-shaped indicating tube carried by the support and having an end exposed for attachment to a source of pressure or vacuum, and a part selectively movable on the support into a position to seal directly the open end of the tube or into a position to expose the open end of the tube and permit of a connection of the same to a source of pressure or vacuum.

5. In a portable vacuum and pressure gauge, the combination of a casing comprising relatively movable sections, an indicating tube with an open end for attachment to a source of pressure or vacuum carried by one of the sections and exposed by a separation of the sections, and a sealing device carried by the other of the sections for automatically closing the end of the tube when the sections are brought together and opening the end when the sections are separated.

6. In a portable gauge, the combination of a casing having relatively movable sections, a U-shaped pressure indicating tube with an open end carried by one of the sections and exposed by a separation of the sections, and a sealing device carried by the other of the sections for automatically closing the end of the tube when the sections are brought together and opening and exposing the end when the sections are separated, said other section having windows therein permitting observation of the tube and also a scale adjustable by separation of the sections to various extents to directly measure the difference in level of the ends of a liquid column in the tube.

7. In a portable gauge, the combination of a casing having relatively movable sections, a U-shaped pressure indicating tube with an open end carried by one of the sections and exposed by a separation of the sections, and a sealing device carried by the other of the sections for automatically closing the end of the tube when the sections are brought together and opening the end when the sections are separated.

8. In a portable gauge, the combination of a casing having relatively movable sections, an indicating tube carried by one of the sections and having an open end which is closed by the other section when the sections are entirely together and opened when the sections are partially separated, and a locking device between the sections for preventing their separation.

9. In a portable gauge, the combination of a casing having relatively movable sections, an indicating tube carried by one of the sections and having one of its ends open and which may be closed by the other section when the sections are entirely together and opened when the sections are partially separated, lugs carried upon the inner faces of each section and each abutting the inner face of the opposite section to prevent crushing of the tube, and a rod passing through one of the sections and threaded into a lug carried by the other of the sections for locking the sections against separation which would open the tube, said rod passing through the remainder of the lugs for forming therewith a bearing guide for the sections when approaching or separating with respect to one another.

10. In a portable gauge, the combination of a casing having relatively movable sections, an indicating tube carried by one of the sections and having one of its ends open and which may be closed by the other section when the sections are entirely together and opened when the section are partially separated, lugs carried upon the inner faces of each section and each abutting the inner face of the opposite section to prevent crushing of the tube, a rod passing through one of the sections and threaded into a lug carried by the other of the sections for locking the sections against separation which would open the tube, said rod passing through the remainder of the lugs for forming therewith a bearing guide for the sections when approaching or separating with respect to one another, the section which is movable with respect to the tube having windows therein to permit of observation of the levels of a liquid in the tube, and also having a scale for measuring the difference in levels of the liquid in the two branches of the tube.

11. In a portable pressure and vacuum gauge, the combination of a casing having a section movable with respect thereto, a U-shaped tube supported within the casing with its open ends normally closed by the movable section when the latter closes the casing and exposed for connection of either with a source of pressure or vacuum to be measured when the casing is opened, said tube being partially filled with a liquid for indicating by the difference in levels of the ends of the column of liquid the pressure or vacuum existent in the connection to one end of the tube.

12. In a portable pressure and vacuum gauge, the combination of a casing having a section movable with respect thereto, a U-shaped tube support within the casing with its open ends normally closed by the movable section when the latter closes the casing and exposed for connection of either with a source of pressure or vacuum to be measured when the casing is opened, said tube being partially filled with a liquid for indicating by the difference in levels of the ends of the column of liquid the pressure or vacuum existent in the connection to one end of the tube, and a locking device between the casing and movable section thereof for holding the casing closed with the ends of the tube closed to prevent loss of the liquid during transportation of the gauge.

13. In a portable pressure and vacuum gauge, the combination of a casing having a section movable with respect thereto, and a U-shaped tube supported within the casing with its open ends normally closed by the movable section when the latter closes the casing and exposed for connection of either with a source of pressure or vacuum to be measured when the casing is opened, said tube being partially filled with a liquid for indicating by the difference in levels of the ends of the column of liquid the pressure or vacuum existent in the connection to one end of the tube, said movable section having windows therein, permitting observation of the levels of the liquid in the tube and also having a scale co-operating with the windows to enable direct measurment of the difference in level of the ends of the column of liquid by the adjustment of the movable section with respect to the casing.

In witness whereof, I hereunto subscribe my signature.

ERIC R. BROKVIST.